Figure 1:
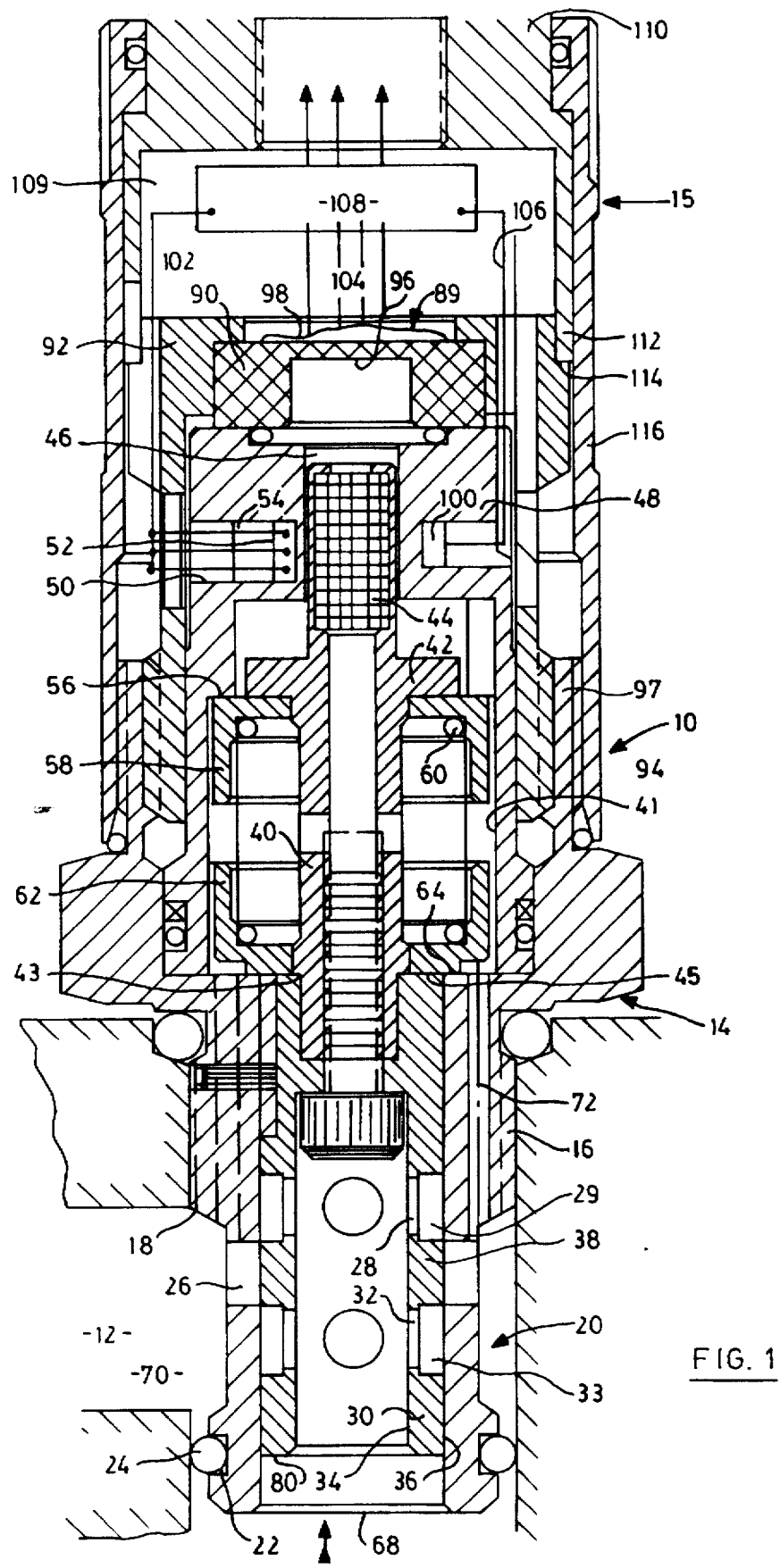

United States Patent [19]

Kadlicko

[11] Patent Number: 5,747,702
[45] Date of Patent: May 5, 1998

[54] DIAGNOSTIC DEVICE FOR HYDRAULIC CIRCUIT

[75] Inventor: George D. Kadlicko, Mississauga, Canada

[73] Assignee: Microhydraulics, Inc., Canada

[21] Appl. No.: 597,618

[22] Filed: Feb. 6, 1996

[30] Foreign Application Priority Data

Feb. 6, 1995 [CA] Canada ................. 2141897

[51] Int. Cl.$^6$ ............................................. G01F 1/26
[52] U.S. Cl. ............................................. 73/861.53
[58] Field of Search ................. 73/861.47, 861.53, 73/861.54, 861.55, 861.58

[56] References Cited

U.S. PATENT DOCUMENTS

| | | | |
|---|---|---|---|
| 4,194,394 | 3/1980 | Bartholomaus | 73/861.54 |
| 4,475,407 | 10/1984 | Kruncos | 73/861.53 |
| 5,024,105 | 6/1991 | Tentler et al. | 73/861.54 |
| 5,313,844 | 5/1994 | Kadlicko | 73/861.54 |

FOREIGN PATENT DOCUMENTS

| | | | |
|---|---|---|---|
| 0505958 | 9/1992 | European Pat. Off. | G01F 1/26 |
| 2123964 | 2/1994 | United Kingdom | G01P 5/14 |
| 9325868 | 12/1993 | WIPO | G01F 1/26 |

*Primary Examiner*—Richard Chilcot
*Assistant Examiner*—Harshad Patel
*Attorney, Agent, or Firm*—Ladas & Parry

[57] ABSTRACT

A diagnostic device for a hydraulic circuit includes a flow transducer to provide an indication of flow rate, a pressure transducer to provide a signal indicative of pressure, and a temperature transducer to provide a signal indicative of temperature. Each transducer provides an output signal calibrated by look-up tables stored in an integrated circuit located in the device.

11 Claims, 2 Drawing Sheets

DIAGNOSTIC DEVICE FOR HYDRAULIC CIRCUIT

The present invention relates to transducers for monitoring parameters in a fluid circuit.

In order to control a hydraulic circuit, it is necessary to monitor the parameters in the circuit and provide a signal indicative of the magnitude of these parameters.

The fundamental parameters to be monitored are fluid pressure and flow rate. Pressure transducers are used to monitor the pressure in a circuit and may be used either to control the maximum pressure in the circuit or to control components of the circuit, such as a pump.

Similarly, flow transducers are used to determine the flow rate at a point in the circuit and can be used to limit flow or control other components.

Pressure transducers are relatively simple and provide reliable readings over a range of operating conditions. Flow transducers, however, typically are intrusive and monitor flow rate by causing the monitored fluid to flow through an orifice and measuring the effect upon a component of the transducer. Manufacturing tolerances may therefore affect the operation of the transducer and as such, the signal obtained from the transducer is less reliable. Moreover, the signal obtained is influenced by varying conditions in the circuit, such as temperature changes, as well as the inevitable interdependence between the flow and pressure fluctuations in the circuit.

It is usual to provide separate transducers for each sensed parameter with a view to enhancing the flexibility of the installation. However, the use of separate components leads to additional cost, complexity and difficulty with integrating the control signals obtained.

There is therefore a need for a simple yet effective transducer to monitor parameters such as flow and pressure in a hydraulic circuit and it is an object of the present invention to provide a transducer in which the above disadvantages are obviated or mitigated.

In general terms, the present invention provides a diagnostic device for measuring and indicating parameters in a hydraulic circuit comprising a body, with an inlet and an outlet, a flow transducer including a piston slidable within said body and co-operating with said body to present a variable orifice between said inlet and outlet, a position sensor located in said body and monitoring movement of the said piston to provide a signal indicative of the position thereof relative to said body, a pressure transducer located in said body to receive fluid flowing between said inlet and outlet and provide a signal indicative of the pressure thereof, a temperature transducer to monitor the temperature of fluid flowing between said inlet and outlet and means to generate a signal indicative of flow rate, pressure and temperature from respective ones of said transducers.

Figure 2:
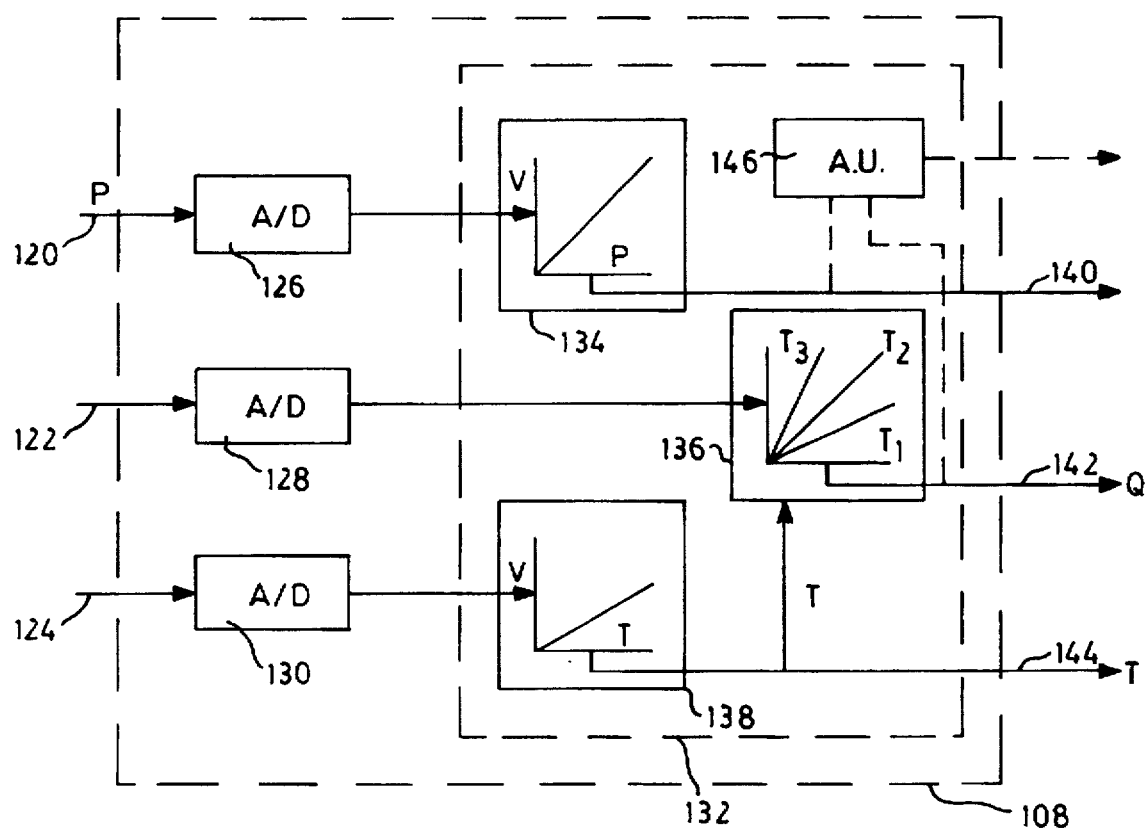

An embodiment of the invention will now be described with reference to the accompanying drawings, in which FIG. 1 shows a section through a flow transducer; and FIG. 2 shows schematically a signal processing function.

Referring therefore to FIG. 1, a diagnostic device 10 is located within a conduit 12. The device 10 includes a body 14 and an external housing 15. The body 14 has an external thread 16 received in a threaded bore 18 on the wall of the conduit 12. A cylindrical sleeve 20 depends from the body 14 and has a circumferential groove 22 at its lower end that carries an O-ring 24. The O-ring 24 is in sealing engagement with the wall of the conduit 12 so that the sleeve 20 acts as a barrier to fluid flowing through the conduit 12.

An aperture 26 is provided on the sleeve 20 by means of a set of four circumferentially spaced holes that extend from the exterior wall of the sleeve 20 to the interior wall. As such, fluid may flow past the barrier provided by the sleeve 20 by passing through the aperture 26.

A piston 30 is slidably mounted within the sleeve 20 and has two sets of ports 28,32 extending between an inner surface 34 and an outer surface 36. Each set of ports 28,32 has an annular groove 29,33 extending about the outer surface 36 to define an annular land 38. A land 38 is dimensioned to correspond to the diameter of the aperture 26, allowing the outer surface 36 to maintain a sealing engagement with each of the apertures. In the position shown in the drawing, fluid flow through the aperture 26 is prevented but axial movement of the piston 30 to either side of that position will allow flow through one or the other of the apertures.

The piston 30 includes an extension 40 that extends into a cavity 41 formed on an upward projection of the body 14. The extension 40 includes a flange 42 adjacent one end and carries an insert 44 of a magnetic material beyond the flange 42. The location of the flange 42 relative to the piston 30 is determined by a shoulder 43 formed in the extension 40 which abuts the end face 45 of piston 30. The distance between the flange 42 and end face 45 can thus be accurately maintained.

The magnetic insert 44 carried by extension 40 is slidably received within a bore 46 formed in an end cap 48 that is received within the body 14 to define one end of the cavity 41. The end cap 48 is bored as indicated at 50 to receive a transducer 52 of the Hall effect type in close proximity to the bore 46. The transducer 52 is sealed within the bore 50 by an epoxy resin 54 which locates the transducer 52 firmly within the end cap 48.

The end cap 48 includes a shoulder 56 that projects radially inwardly from the body 14. A cup 58 is located on the extension 40 below the flange 42 and extends radially to the shoulder 56. The cup 58 is free to slide on the extension 40 but axial movement is limited by either the shoulder 56 or the flange 42.

A coil spring 60 is located within the cavity 41 around the extension 40 and one end bears against the cup 58. The opposite end of the spring 60 bears against a similar cup 62 which is also free to slide relative to the extension member 40 and extends radially outwardly to abut a radial shoulder 64 at the lower end of the cavity 41. The cup 62 also abuts the end face 45 of the piston 30.

Axial extension of the spring 60 is thus limited by the abutment of the cups 58,62 with the shoulders 56,64 respectively but movement of the piston 30 axially within the sleeve 20 will cause movement of one of the cups 58,62 and compression of the spring 60. The spring 60 thus acts to maintain the piston 30 with the land 38 centred on the aperture 26 so that a barrier to flow in the conduit 12 is provided. The spacing between the shoulders 56,64 corresponds to the spacing between the flange 42 and the end face 45 so that when the cups 56,62 abut the shoulders 56,64, they also abut the flange 42 and end face 45. The piston 30 is thus maintained centred by physical abutments rather than the characteristics of spring 60.

The sleeve 20 thus effectively divides the conduit 12 into upstream and downstream portions which, for the direction of flow indicated by arrow A, are designated 68,70 respectively. It will, however, be understood that with the embodiment shown in the drawings the direction of flow may be reversed so that portion 70 becomes the upstream and portion 68 becomes the downstream portion.

A duct 72 in the body 14 provides fluid communication between the downstream portion 70 and the cavity 41. Duct 72 ensures that fluid pressure in the downstream portion 70 acts on the radial face 45 of the piston 30.

The piston 30 also presents a radial face 80 to the fluid in the upstream portion 68. The piston 30 is thus subjected to oppositely acting axial forces derived by the pressure on the faces 80 and 45. Any difference in those pressures will tend to act against the spring 60 and move the piston 30 axially within the sleeve 20 and allow the land 38 to connect the aperture 26 within one of the grooves 29,33.

A pressure transducer 89 is located in the device body 14 adjacent end cap 48. The fluid in cavity 41 acts against a diaphragm 90 that overlies the bore 46 and is held in sealing engagement with the end cap 48 by a retaining collar 92. The collar 92 engages an internal thread 94 in a cylindrical wall 97 of the body 14 to secure it to the body 14. Diaphragm 90 has a relatively thin end wall 96 which carries a strain gauge 98. Flexure of the end wall 96 will thus vary the signal from the strain gauge to provide a signal indicative of fluctuation of pressure in the cavity 41.

The end cap 48 also carries a temperature probe 100 located adjacent the cavity 41 to sense temperature variations of the fluid. In the preferred embodiment, the temperature probe 100 is diametrically opposed to the position transducer 52 so as to make a measurement adjacent to the insert 44. The signals from the position transducer 52, strain gauge 98 and temperature probe 100 are provided by respective conductors 102,104,106 to an integrated circuit 108 located in a chamber 109 formed between closure housing 110 and the body 14. The closure housing 110 has a cylindrical side wall 112 that engages a shoulder 114 in the retaining collar 92 and is held in place by a locking sleeve 116 that engages an external thread on body 14 to define the external housing 15.

The function of the integrated circuit 108 is shown schematically in FIG. 2 and includes an analogue input signal 120,122,124 from each transducer 52,89 and 100 respectively. The input signals 120,122,124 are supplied to respective analogue to digital (AD) converters 126,128,130 whose outputs are connected to a microprocessor 132. The microprocessor 132 includes look-up tables 134,136,138 calibrated against reference values to linearize the output of each transducer. The look-up table 136 associated with the position transducer 52 is also calibrated against temperature to indicate variations in flow rate with temperature. The microprocessor 132 has individual outputs 140,142,144 providing signals indicative of pressure, temperature and flow rate and may include an arithmetic unit 146 to combine two or more of the outputs, for example, pressure and flow, to provide a signal indicative of a derived value, e.g. horsepower.

The look-up tables 134,136,138 may be calibrated against a master unit prior to installation to provide complete interchangeability of the device.

In operation, therefore, the pressures in the upstream and downstream portions 68,70 respectively will be equal if there is no flow through the conduit 12. In this condition, the pressure forces acting on the piston 30 are equal and opposite and the piston 30 is located by the shoulders 56,64 in a position such that flow through the apertures 26,28 is prohibited.

Upon flow of fluid through the conduit 12 from the upstream portion 68 to the downstream portion 70, the pressure in the upstream portion will initially increase, causing the pressure forces on the face 80 to be greater than those on the face 45. The piston 30 thus moves axially within the sleeve 30 and causes one of the grooves 29,33 to overlap the aperture 26. In this position, the fluid can flow from the upstream portion through the orifice defined by the overlapping of the aperture 26 with one of the grooves 29,33 and into the downstream portion 70. Because of the restricted flow through the aperture 26, a pressure differential will exist between the upstream and downstream portion 68,70 so that the pressure forces acting on the face 66 will be less than those on the face 80. The piston 30 will thus move axially upwardly as viewed in the drawings so that the piston face 45 moves toward the shoulder 56. The piston 30 carries the cup 62 with it as it moves axially upwardly but movement of the cup 58 is prohibited by the shoulder 56. The coil spring 60 is thus compressed and the force provided by the spring 60 on the piston 30 increases. The piston 30 will move to a position in which the pressure differential through the orifice 26 is balanced by the force of the spring 60. However, as the piston 30 moves the area of orifice also increases so that the range of pressure differentials across the piston over the range of flows will be less than would be experienced with a fixed orifice. Thus, for each flow rate through the conduit 12, the piston will adopt a particular position.

Movement of the piston 30 is detected by the movement of the magnetic insert relative to the Hall effect transducer 52 and a voltage signal provided for each position of the piston. Thus, a signal is provided from the transducer 52 that is indicative of the rate of flow of fluid through the conduit 12. As the flow increases, the pressure differential across the piston 30 will increase and the piston 30 will move to a new position in which the spring 60 is further compressed and the forces acting on the piston again balanced. The transducer 52 thus provides a new signal indicative of the new flow rate.

If the flow of fluid reverses within the conduit 12 such that the portion 70 becomes the upstream portion and the portion 68 becomes the downstream portion, the pressure forces on face 66 will be greater than those acting on face 80. Thus, the piston 30 will move downwardly such that the cup 58 is carried by the flange 42 toward the shoulder 64. Again, the spring 60 is compressed until the forces acting on the piston are balanced. The insert 44 varies the signal from the Hall effect transducer 52 so that a unique signal is provided that indicates the relative movement of the piston 30 from which flow rate and direction of flow may be derived.

The fluid pressure in the cavity 41 also acts against the diaphragm 90 to provide a signal indicative of the pressure at aperture 26 and probe 100 provides a signal indicative of temperature of fluid at aperture 26.

The signals are processed at the integrated circuit 108 to provide discrete values of pressure, temperature and flow rate through the device 10. As noted above, the temperature signal 124 is used to modify the displacement signal 120 so that the flow rate output signal 140 provides an accurate indication of flow rate.

It will be seen, therefore, that the device 10 provides a simple yet robust transducer that provides a signal indicative of flow rates and whose output varies as the flow in the conduit 12 varies. In view of the fact that the position of the piston 30 is acted upon directly by fluid flowing through the aperture 26, it will be apparent that a dynamic measurement of the flow rate is provided and any fluctuations will cause a corresponding movement of the piston 30. The null position of the piston is maintained positively and a single spring is used to balance motion in each direction and thereby minimize manufacturing difficulties. The device 10 also provides a full indication of other system parameters and utilises those parameters to compensate for the indicated value.

The device 10 is conveniently formed as a self-contained unit that is accomodated into a standard fitting. Thus, only a single interruption of fluid flow is required. The body 14 may thus be configured as a standard cartridge configuration that may be fitted into existing ports of hydraulic equipment and a full diagnostic test conducted. The outer sleeve 116 provides a secure enclosed housing for the transducers, again within an overall envelope that is conventional and ensures interchangeability of the diagnostic device 10 with other fittings. The body 14 effectively contains the fluid contacting components of the device within a sealed unit and the external housing 15 provides a protective environment for the electrical components.

We claim:

1. A hydraulic diagnostic device for measuring and indicating parameters in a hydraulic circuit comprising a body, a fluid conduit in said body having an inlet and an outlet, a flow transducer to measure fluid flow in said conduit including a piston slidable within said body and cooperating with said body to present a variable orifice in said conduit, a position sensor located in said body and monitoring movement of said piston to provide a first signal indicative of the position thereof relative to said body, a pressure transducer located in said body and in fluid communication with said conduit to monitor fluid in said conduit and provide a second signal indicative of a pressure of fluid being monitored, a temperature transducer to monitor the temperature of fluid flowing in said conduit between said inlet and outlet and provide a third signal indicative of the temperature of fluid in said conduit, each of said transducers being independently operable to generate respective signals indicative.

2. A diagnostic device according to claim 1 wherein each of said respective signals from said transducers is calibrated against a reference value.

3. A diagnostic device according to claim 2 wherein variations of one of said signals is used to modify another of said signals.

4. A diagnostic device according to claim 3 wherein variations in said signals obtained from said temperature transducer are utilized to modify said signal provided by said position transducer.

5. A diagnostic device according to claim 1 wherein said pressure transducer is connected to fluid flowing between said inlet and outlet by an internal duct intersecting said fluid conduit.

6. A diagnostic device according to claim 5 wherein said internal duct includes an internal cavity and said position transducer is slidable within said cavity.

7. A diagnostic device according to claim 6 wherein said temperature transducer is located in a wall of said duct.

8. A diagnostic device according to claim 7 wherein said temperature sensor is disposed adjacent said position transducer.

9. A diagnostic device according to claim 7 wherein said transducers communicate with an integrated circuit located within a housing secured to said body and remote from said duct.

10. A diagnostic device according to claim 6 wherein said pressure transducer is located at an end wall of said cavity.

11. A diagnostic device according to claim 10 wherein said pressure transducer includes a diaphragm and said position transducer moves toward and away from said diaphragm as said position transducer slides in said cavity.

* * * * *